United States Patent [19]
Ancona

[11] Patent Number: 5,526,569
[45] Date of Patent: Jun. 18, 1996

[54] PIZZA SERVER

[75] Inventor: Bruce Ancona, New York, N.Y.

[73] Assignee: B. Via International Housewares, Inc., Englewood Cliffs, N.J.

[21] Appl. No.: 371,768

[22] Filed: Jan. 12, 1995

[51] Int. Cl.$^6$ .................................................. A47J 43/28
[52] U.S. Cl. ................................................. 30/169; 30/142
[58] Field of Search ............................ 30/114, 142, 322, 30/324, 169, 172; 177/642; 294/49, 55; 15/236.1

[56] References Cited

U.S. PATENT DOCUMENTS

| | | | |
|---|---|---|---|
| 2,583,154 | 1/1952 | Pape | 294/55 X |
| 4,074,917 | 2/1978 | Federico . | |
| 4,574,479 | 3/1986 | Gramann . | |
| 4,632,836 | 12/1986 | Abbott et al. . | |
| 4,635,843 | 1/1987 | Tomlinson . | |
| 4,826,033 | 5/1989 | Satoh | 30/324 |

*Primary Examiner*—Douglas D. Watts
*Attorney, Agent, or Firm*—Henry D. Pahl, Jr.

[57] ABSTRACT

The server disclosed herein incorporates first and second relatively rigid elements joined by an elongate hinge. The elements are essentially complimentary in shape and each provides a half handle portion and, extending from the half handle portion, a flat half blade portion, the half handle portions and the half blade portions being joined by respective sections of the hinge. The two rigid elements are moveable between a first position in which the blade portions are essentially coplanar, where they can be used to lift a food-stuff such as a slice of pizza from a pan, and a second position in which the blade portions form a shallow V-shape to retain the foodstuff. The elements can be moved from the first position to the second position by a user squeezing the handle portions together.

10 Claims, 1 Drawing Sheet

PIZZA SERVER

BACKGROUND

The present invention relates to a food server and, more particularly, to a food server which is hinged to permit blade portions, initially coplanar, to be moved to a shallow V-configuration for retaining a foodstuff held on the blade. While the prior art contains many types of food servers, including a variety adapted particularly for the serving of pizza, these prior art devices have done little to allow a user to securely retain the foodstuff on a blade structure which initially picks up the foodstuff, e.g., from a pan.

Among the several objects of the present invention, may be noted the provision of a novel food server; the provision of such a server which facilitates the retaining of a foodstuff once it has been picked up; the provision of such a server which is particularly adapted for the serving of pizza; the provision of such a server which securely retains a foodstuff in a shallow trough; the provision of such a server which is easily operated; the provision of such a server which is highly reliable and which is of relatively simple and inexpensive construction. Other objects and features will be in part apparent and in part pointed out hereinafter.

SUMMARY OF THE INVENTION

A food server in accordance with the present invention involves first and second relatively rigid elements joined by an elongate hinge. The elements are preferably complimentary in shape and essentially symmetrical around the hinge axis. Each of the elements include a half handle portion and, extending from the half handle portion, a flat half blade portion. The half blade handle portions and half blade portions are joined by the respective sections of the hinge and are moveable between a first position in which the blade portions are essentially coplanar and the handled portions are somewhat separated, and a second position in which the blade portions form a shallow V-shape and the handle portions are less separated. Accordingly, the elements can be manually moved from the first position to the second position by a user squeezing the handle portions together, thereby to form the blade portions into a shallow V for retaining a foodstuff lifted thereon.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
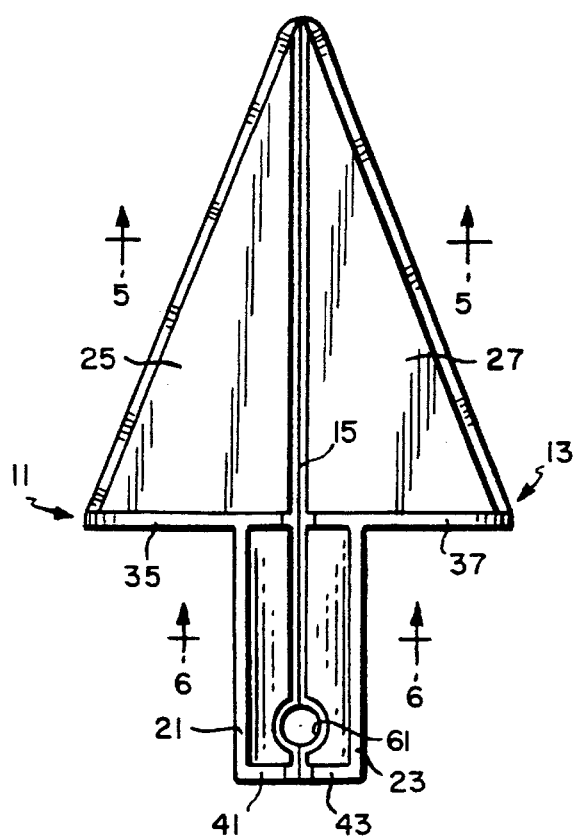
FIG. 1 is a top view of a server constructed in accordance with the present invention.
Figure 2:
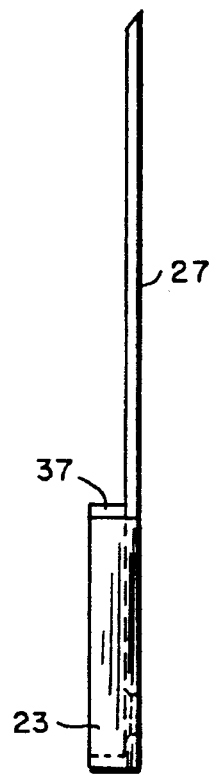
FIG. 2 is a side view of the server of FIG. 1.

Referring now to the drawings, the server illustrated there is constructed in two relatively rigid elements, designated by reference characters 11 and 13, joined by an elongate hinge 15 which extends the length of the elements. In the preferred embodiment illustrated, the server is constructed as an integral molding of a plastic resin such as polyethylene wherein the thickness of the molding in the regions forming the rigid elements 11 and 13 is thick enough to provide substantialy rigidity, while the thickness at the hinge 15 is reduced so as to provide a relatively flexible joining of the two relatively rigid elements. In the art, this arrangement is commonly referred to as a "living" hinge. A metal construction utilizing a so-called piano-type hinge might also be employed.

Each of the rigid elements, 11 and 13, includes a half handle portion, designated by reference characters 21 and 23 respectively, and a half-blade portion, designated by reference characters 25 and 27 respectively. The half blade portions 25 and 27 each are configured as right triangles which, when joined at the hinge 15, form an isoceles triange, corresponding roughly to a typical pie wedge or pizza slice. The exterior edges of the blade portions are preferably bevelled to provide a sharp edges suitable for sliding under a foodstuff resting on a pan.

Figure 6:
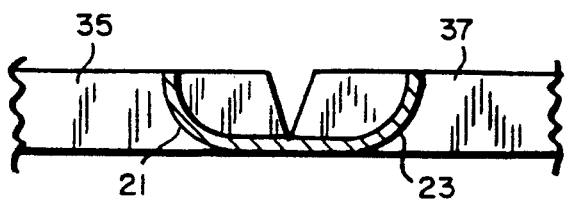
FIG. 6 is a sectional view taken substantially on the line 6—6 of FIG. 1.

As may be seen in FIG. 6, each of the half handle sections 21 and 23 is constructed essentially as an axially sectioned portion of a tube-like shape, but the sections are somewhat splayed apart when the server is in its flat configuration as illustrated in FIG. 1. Each of the half handle sections 21 and 23 is joined to the respective half blade section by a transverse flange portion, 35 and 37 respectively, which add stiffness as will be understood by those skilled in the art. The proximal ends of the handle portions are also partially closed by flanges as indicated by reference characters 41 and 43.

The adjacent ends of the flange portions 35 and 37 and the ends of flange portions 41 and 43 are bevelled as may be seen in FIGS. 3 and 6, so as to form respective stop portions which limit folding of the two elements 11 and 13 around the hinge, as described in greater detail hereinafter. Preferably an aperture, as indicated by reference character 61, is provided between the two half handle portions 21 and 23 near their proximal ends to facilitate hanging of the utensil in conventional manner.

Figure 3:
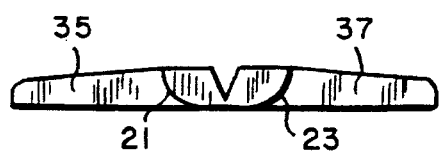
FIG. 3 is a rear or handle-end view of the server of FIG. 1 in its flattened or relaxed configuration.
Figure 5:
FIG. 5 is a sectional view taken substantially on the line 5—5 of FIG. 1.
Figure 4:
FIG. 4 is a rear or handle-end view of the server actuated to form a shallow V.

As will be apparent, the server is adapted to be easily slid under a foodstuff, such as a slice of pizza, when the server is in its relaxed or flattened configuration, as illustrated in FIG. 3, i.e., when the flat half blade portions 25 and 27 are essentially coplanar. Then, by squeezing the half handle portions 21 and 23 together, the user can cause the half blade portions 25 and 27 to adopt a shallow V configuration as illustrated in FIG. 4. As will be apparent, this shallow V configuration will help to retain the foodstuff on the blade portion and inhibit spilling.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A server comprising:

first and second relatively rigid elements joined by an elongate hinge, each of said elements including a handle portion and, extending from each said handle portion, a flat blade portion, each of said blade portions being a right triangle which together form an isoceles triangle, said elements being movable between a first position in which said blade portions are essentially aligned and said handle portions are separated and a second position in which said blade portions form a shallow V-shape and said handle portions are less separated, whereby said elements can be manually moved from said first position to said second position by a user squeezing said handle portions together thereby to form said blade portions into said shallow V for retaining a foodstuff lifted on said blade portions.

2. A server as set forth in claim 1 wherein each of said elements further includes a stop portion and wherein said stop portions engage to limit motion of said elements at said second position.

3. A server as set forth in claim 1 wherein each of said handle portion comprises a portion of an axially sectional tube.

4. A server as set forth in claim 1 wherein said elements and said hinge are formed as an integral molding of a plastic resin with said hinge being formed by a relatively thin section of said resin.

5. A server as set forth in claim 4 wherein said material is polyethylene.

6. A server comprising:

first and second relatively rigid elements joined by an elongate hinge, said relatively rigid elements and said hinge being formed as an integral molding of a plastic resin with said hinge being formed by a relatively thin section of said resin, said elements being complementary in shape and essentially symmetrical around the hinge axis, each of said elements including a half handle portion and, extending from each said half handle portion, a flat blade portion, the half handle portions and the half blade portions being joined by respective sections of said hinge, said elements being movable between a first position in which said blade portions are essentially coplanar and said handle portions are separated and a second position in which said blade portions form a shallow V-shape and said handle portions are less separated, whereby said elements can be manually moved from said first position to said second position by a user squeezing said handle portions together thereby to form said blade portions into said shallow V for retaining a foodstuff lifted on said blade portions.

7. A server as set forth in claim 6 wherein said blade elements together form an essentially isoceles triangle and wherein each of said handle portions comprises a portion of an axially sectioned tube.

8. A server as set forth in claim 7 wherein each of said handle portions is joined to the respective blade portion at a transverse flange and wherein the adjacent portions of the flanges at said hinge are tapered to form mutually engaging stop elements which limit flexing of said hinge to said second position.

9. A server as set forth in claim 6 wherein said material is polyethylene.

10. A server constructed as an integral molding of a plastic resin and comprising:

first and second relatively rigid elements joined by an elongate living hinge, said elements being complementary in shape and essentially symmetrical around the hinge axis, each of said elements including a half handle portion and, extending from each said half handle portion, a generally triangular half blade portion, the half handle portions and the half blade portions being joined by respective sections of said hinge, said elements being movable between a first position in which said blade portions are essentially coplanar and said handle portions are separated and a second position in which said blade portions form a shallow V-shape and said handle portions are less separated, each of said elements further including a stop portion, said stop portions engaging to limit motion of said elements at said second position, whereby said elements can be manually moved from said first position to said second position by a user squeezing said handle portions together thereby to form said blade portions into said shallow V for retaining a foodstuff lifted on said blade portions.

* * * * *